Aug. 22, 1933.  R. HOE  1,923,867
KITCHEN APPLIANCE
Filed March 15, 1929  2 Sheets-Sheet 1
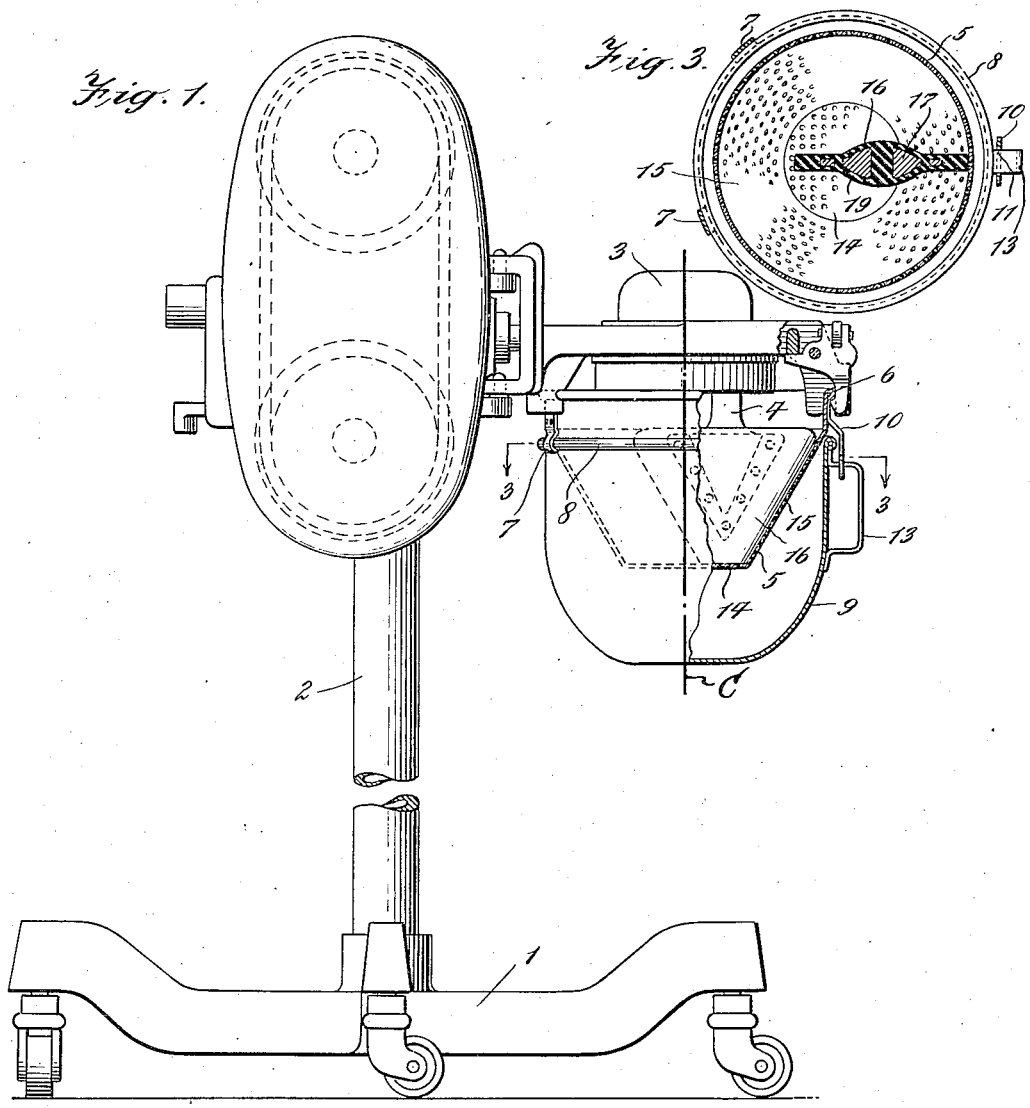
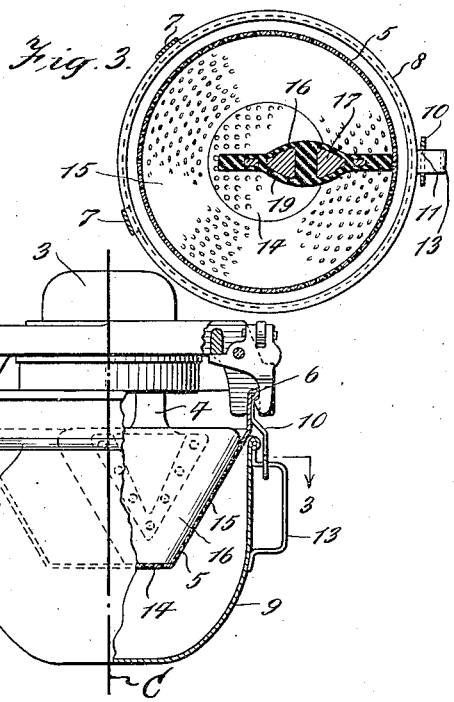
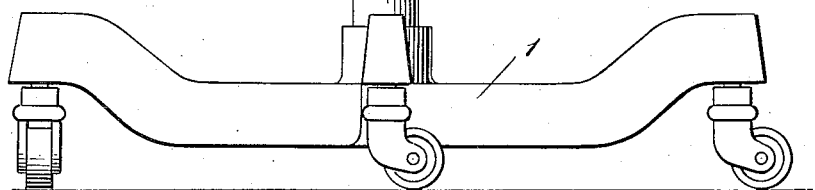
INVENTOR
Robert Hoe
BY
Gifford, Scull & Burgess.
ATTORNEY Aug. 22, 1933.                R. HOE                    1,923,867
                          KITCHEN APPLIANCE
                      Filed March 15, 1929        2 Sheets-Sheet 2
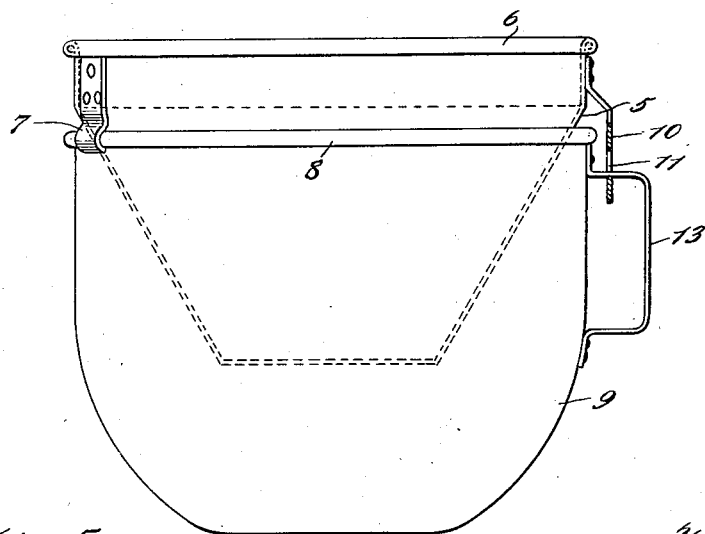
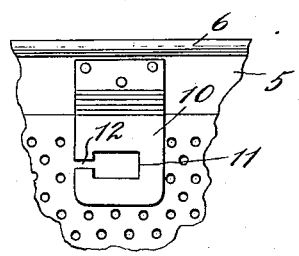
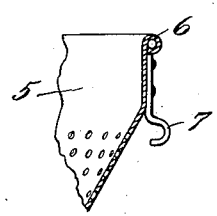
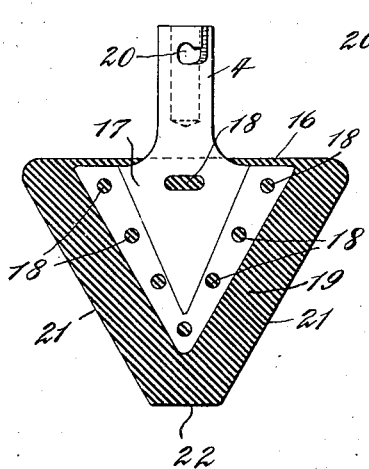
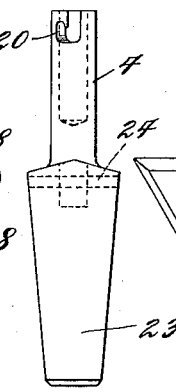
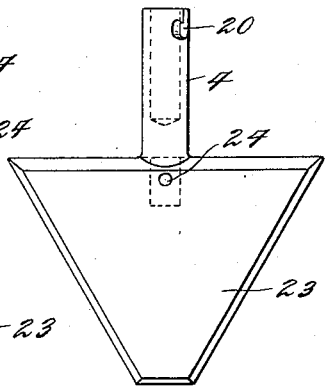
INVENTOR
Robert Hoe
BY
Gifford, Scull & Burgess
ATTORNEY Patented Aug. 22, 1933

1,923,867

UNITED STATES PATENT OFFICE 1,923,867

KITCHEN APPLIANCE

Robert Hoe, Hyde Park, N. Y.

Application March 15, 1929. Serial No. 347,318

12 Claims. (Cl. 146—175)

This invention relates to a novel and improved kitchen appliance and the novel features will be best understood from the following description and the annexed drawings, in which I have shown selected embodiments of the invention and in which:

Fig. 1 is an elevation of a kitchen power unit having my invention applied thereto.

Fig. 2 is a plan view of the operating head of the power unit, as seen in Fig. 1.

Fig. 3 is a section on the line 3—3 of Fig. 1.

Fig. 4 is an elevation of the colander and associated pan detached from the operating head.

Fig. 5 is a detail of the means for detachably securing the pan in position with respect to the colander.

Fig. 6 is a detail of one of the supporting brackets for the pan.

Fig. 7 is a vertical sectional view through the form of utensil shown in Figs. 1, 2 and 3.

Fig. 8 is an edge view of another form of utensil, and Fig. 9 is a view taken at right angles to Fig. 8.

The invention is shown as employed with a power unit having a movable base 1 and an upwardly extending standard 2 upon which are supported suitable devices for operating gearing disposed within a head 3, this gearing being adapted to impart movement to a vertically extending shaft which then forms part of the unit and upon which may be detachably secured the spindle 4 of a suitable utensil.

The aforesaid shaft is usually operated by means of a planetary gearing, in such a way as to cause rotation thereof about its own axis and also bodily movement about the axis of the planetary gearing. Such devices are well known and will not be further described herein.

Disposed beneath the operating head 3 is a colander 5 having a beaded edge 6 which is adapted to engage suitable devices for securing the colander to the head. The colander is an example of a receptacle which is adapted to hold articles of food, such as vegetables and fruits, while they are being worked upon by a suitable utensil, and which is adapted to discharge the resulting product. The colander is provided with a plurality of brackets 7, here shown as in the form of inwardly extending hooks, which are adapted to engage the beaded edge 8 of a receptacle exemplified by a pan 9, and to hold this receptacle in position to receive the material discharged from the colander.

The colander is also provided with means for detachably securing the receptacle in place on the colander, this means comprising a latch 10 in the form of a vertical plate having a recess 11 therein, this recess having a narrow mouth 12 in one of the vertical sides of the recess through which may slide the handle 13 on the pan 9. It will be seen that the two brackets 7 are non-symmetrically disposed with respect to a diameter through the latch 10, whereby the pan may be readily slid into position from one side.

As plainly shown, the colander is in the form of a truncated cone having a flat bottom 14 and conical sides 15. The utensil 16 supported on the spindle 4 may be made in various ways, but is shown in Figs. 1, 2, 3 and 7 as comprising a core 17 preferably integral with the spindle 4 and having a plurality of holes 18 therethrough. Molded on this core is a flexible body 19 preferably of rubber or the like, and it will be seen that the material of the body will pass through the aforesaid holes to form a secure joint between the body and the core. The spindle 4 may be provided with a bayonet slot 20 to secure the spindle and the utensil to the shaft of the operating head.

With the arrangement described above, articles of food, which it is desired to crush, may be placed in the colander, and the power unit may be put in operation to cause movement of the shaft upon which is supported the spindle 4. The arrangement is such that the edges 21 of the utensil are slightly bent as they come in contact with the conical sides 15 of the colander. This arrangement is particularly useful when operating upon vegetables or fruits having seeds. The end 22 of the utensil at the same time will rotate along the bottom 14 of the colander, it being noted that the shape of the utensil is similar to the shape of the colander, so that the above action will take place.

As will be seen from an inspection of Figs. 1 and 3, the top of the utensil 16, which is in the form of a paddle, is in a horizontal plane, and is longer than the radius of the receptacle or colander 5, measured in this plane. It will also be noted that the length of the lower end of the paddle is less than the radius of the bottom of the colander. The result is that when in the position shown in Figs. 1 and 3, the inner edge of the paddle crosses the axis C of the colander. By this arrangement there is provided in the bottom of the colander near its center, a space which is never covered by the end of the paddle, and pits and the like may accumulate in this space without being further agitated by the operation of the paddle. At the same time, the paddle above this space extends a substantial distance beyond the center of the colander in its rotation, and thus insures proper agitation of the contents of the colander.

In Figs. 8 and 9 is shown a different form of utensil which may be made entirely of wood or metal, and which may be conveniently employed for vegetables or fruits which do not have seeds. This utensil has a spindle 4 similar to that used with the other utensil, and adapted to be mounted on the shaft of the operating head as by a bayonet slot 20 engaging a pin on the shaft in the well-known manner. The body 23 is preferably made of solid wood which may be secured to the spindle as by a suitable pin 24. This body is of the same general form as in the other utensil, but preferably is made of a size which will either just contact with the colander or which will provide a slight clearance between it and the colander.

I claim—:

1. In combination, a power unit having a vertically disposed shaft, a receptacle having a substantially round flat bottom and conical sides extending upwardly from the bottom, means to support the receptacle beneath said shaft with the shaft eccentric to the bottom, a paddle on said shaft having a flat end substantially engaging the bottom of the receptacle and conical side edges adapted to substantially contact with said conical sides of the receptacle upon rotation of the shaft, and means to rotate said shaft about its own axis and about the center of the receptacle.

2. In combination, a power unit having a vertically disposed shaft, a receptacle having a substantially round flat bottom and conical sides extending upwardly from the bottom, means to support the receptacle beneath said shaft with the shaft eccentric to the bottom, a paddle on said shaft having a flat end substantially engaging the bottom of the receptacle and conical side edges adapted to substantially wipe said conical sides of the receptacle upon rotation of the shaft, said side edges being formed of yielding material, and means to rotate said shaft about its own axis and about the center of the receptacle.

3. In combination, a power unit having a vertically disposed shaft, a receptacle having a substantially round flat bottom and conical sides extending upwardly from the bottom, means to support the receptacle beneath said shaft with the shaft eccentric to the bottom, a paddle on said shaft having a flat end substantially engaging the bottom of the receptacle and conical side edges adapted to substantially contact with said conical sides of the receptacle upon rotation of the shaft, and means to rotate said shaft about its own axis and about the center of the receptacle, said end of the paddle being shorter than the radius of said bottom.

4. In combination, a power unit having a vertically disposed shaft, a receptacle having a substantially round flat bottom and conical sides extending upwardly from the bottom, means to support the receptacle beneath said shaft with the shaft eccentric to the bottom, a paddle on said shaft having a flat end substantially engaging the bottom of the receptacle and conical side edges adapted to substantially contact with said conical sides of the receptacle upon rotation of the shaft, and means to rotate said shaft about its own axis and about the center of the receptacle, the top of said paddle being longer than the radius of the receptacle in the horizontal plane of said paddle top.

5. In combination, a power unit having a vertically disposed shaft, a receptacle having a substantially round flat bottom and conical sides extending upwardly from the bottom, means to support the receptacle beneath said shaft with the shaft eccentric to the bottom, a paddle on said shaft having a flat end substantially engaging the bottom of the receptacle and conical side edges adapted to substantially contact with said conical sides of the receptacle upon rotation of the shaft, and means to rotate said shaft about its own axis and about the center of the receptacle, said end of the paddle being shorter than the radius of said bottom, the top of said paddle being longer than the radius of the receptable in the horizontal plane of said paddle top.

6. In combination, a power unit having a vertically disposed shaft, a receptacle disposed beneath said shaft and having a substantially flat perforated bottom and upwardly extending perforated sides, means to support the receptacle beneath the shaft, with the shaft eccentric to the bottom of the receptacle, a paddle on the shaft having a flat end engaging the bottom of the receptacle and side edges adapted to substantially contact with the sides of the receptacle upon rotation of the shaft, and means to rotate the shaft about its own axis and about the center of the receptacle.

7. In combination, a power unit having a vertically disposed shaft, a receptacle disposed beneath said shaft and having a substantially flat perforated bottom and upwardly extending perforated sides, means to support the receptacle beneath the shaft, with the shaft eccentric to the bottom of the receptacle, a paddle on the shaft having a flat end engaging the bottom of the receptacle and side edges adapted to contact with the sides of the receptacle upon rotation of the shaft, and means to rotate the shaft about its own axis and about the center of the receptacle, said paddle having said side edges formed of flexible material adapted to flex and wipe against the sides of the receptacle during operation.

8. In combination, a power unit having a vertically disposed shaft, a receptacle disposed beneath said shaft and having a substantially flat perforated bottom and upwardly extending perforated sides, means to support the receptacle beneath the shaft, with the shaft eccentric to the bottom of the receptacle, a paddle on the shaft having a flat end engaging the bottom of the receptacle and side edges adapted to contact with the sides of the receptacle upon rotation of the shaft, and means to rotate the shaft about its own axis and about the center of the receptacle, said paddle having said flat end and side edges formed of flexible material adapted to flex and wipe against the sides of the receptacle during operation.

9. In combination, a power unit having an outlet, a head having means for detachably securing it to the unit in operative relation to said outlet, a receptacle adapted to hold articles of food while being worked upon and to discharge the resultant product, means to detachably support said receptacle on said head, means attached to the head and operating upon food in the receptacle, a second receptacle adapted to receive the product discharged from the first receptacle, and means for detachably securing said second receptacle to the first receptacle.

10. In combination, a power unit having an outlet, a head having means for detachably securing it to the unit in operative relation to said outlet, a receptacle adapted to hold articles of food while being worked upon and having perforations through which said food may be forced, a paddle mounted on said head and adapted to work upon food in the receptacle, means to detachably support the receptacle on the head, a second receptacle to receive food forced through said perforations in the first receptacle, and means to detachably support said second receptacle upon the first.

11. In combination, a power unit having a vertically disposed shaft, a receptacle disposed beneath said shaft and having a perforated bottom and upwardly extending perforated sides, means to support the receptacle beneath the shaft with the shaft eccentric to the bottom of the receptacle, a paddle on the shaft having flexible side and bottom edges, said paddle being so shaped and positioned as to wipe the bottom and sides of the receptacle with said edges thereof upon rotation of said shaft about its axis, and means to rotate the shaft about its own axis and about the center of the receptacle.

12. In combination, a power unit having a vertically disposed shaft, a receptacle disposed beneath said shaft and having a perforated bottom and upwardly extending perforated sides, means to support the receptacle beneath the shaft with the shaft eccentric to the bottom of the receptacle, a paddle on the shaft having flexible side edges, said paddle being so shaped and positioned as to wipe the sides of the receptacle with said edges thereof upon rotation of said shaft about its axis, and means to rotate the shaft about its own axis and about the center of the receptacle.

ROBERT HOE.